US011879503B2

(12) United States Patent
Scott et al.

(10) Patent No.: US 11,879,503 B2
(45) Date of Patent: Jan. 23, 2024

(54) ROTATIONALLY STIFF KEY FOR COUPLING NON-PARALLEL SHAFTS

(71) Applicant: Raytheon Company, Waltham, MA (US)

(72) Inventors: Brian S. Scott, Vail, AZ (US); Andrew H. Voss, Aichi (JP)

(73) Assignee: Raytheon Company, Tewksbury, MA (US)

( * ) Notice: Subject to any disclaimer, the term of this patent is extended or adjusted under 35 U.S.C. 154(b) by 286 days.

(21) Appl. No.: 17/388,109

(22) Filed: Jul. 29, 2021

(65) Prior Publication Data

US 2022/0042549 A1 Feb. 10, 2022

Related U.S. Application Data

(60) Provisional application No. 63/060,848, filed on Aug. 4, 2020.

(51) Int. Cl.
*F16D 1/04* (2006.01)
*F16D 1/08* (2006.01)

(52) U.S. Cl.
CPC ............. *F16D 1/04* (2013.01); *F16D 1/0876* (2013.01)

(58) Field of Classification Search
CPC .................................. F16D 1/08; F16D 1/0876
USPC .................... 403/1, 318, 319, 355, 356, 357
See application file for complete search history.

(56) References Cited

U.S. PATENT DOCUMENTS

| | | | | |
|---|---|---|---|---|
| 435,600 A * | 9/1890 | Cornwell | ............... | E21D 21/008 411/77 |
| 921,401 A * | 5/1909 | Hjorth | ................... | F16D 1/0876 403/358 |
| 1,171,267 A * | 2/1916 | Smith | ...................... | H02G 3/22 174/152 G |
| 1,221,709 A * | 4/1917 | Dyett | ................... | F16D 1/0894 279/76 |
| 1,244,848 A * | 10/1917 | Gadke | ................... | F16D 1/0894 411/21 |
| 1,397,530 A * | 11/1921 | Lubeck | ..................... | F16D 3/58 464/83 |
| 1,560,399 A * | 11/1925 | Preston, Sr. | ............... | F16B 3/00 403/279 |
| 1,734,188 A * | 11/1929 | Wilson | .................. | F16D 1/0876 403/356 |
| 1,951,188 A * | 3/1934 | Flaherty | .................... | G05G 1/12 16/DIG. 30 |
| 2,563,166 A * | 8/1951 | Gardner | ................ | F16D 1/0876 403/9 |
| 2,584,115 A * | 2/1952 | Dinsmoor | ............... | B64C 11/48 416/129 |

(Continued)

*Primary Examiner* — Daniel J Wiley
(74) *Attorney, Agent, or Firm* — Renner, Otto, Boisselle & Sklar LLP (57) ABSTRACT

A stiff key provides rigid coupling between a pair of shafts, such as a motor shaft and a rotary position sensor. The key may have a main body and a protrusion from the main body, such as from a middle portion of the main body. One of the protrusion or the main body may engage one part of one of the shafts being coupled together, and the other of the protrusion or the main body may engage a part of the other of the shafts. For example the protrusion may be in a keyway of one shaft and the main body may engage a recess or flat of the other shaft. The key and the coupling may be used in applications where space is at a premium, for example in a missile.

19 Claims, 6 Drawing Sheets

(56) References Cited

U.S. PATENT DOCUMENTS

| | | | | |
|---|---|---|---|---|
| 2,588,064 A * | 3/1952 | Webb | F16D 1/0847 | 411/351 |
| 2,623,765 A * | 12/1952 | Coquille | F16D 1/0876 | 403/356 |
| 2,681,239 A * | 6/1954 | Gillen | F16D 1/0882 | 411/452 |
| 2,894,772 A * | 7/1959 | Hitt | F16D 1/0876 | 403/282 |
| 2,905,490 A * | 9/1959 | Trandel | F16D 1/0876 | 403/356 |
| 2,937,042 A * | 5/1960 | Wilder, Jr. | F16D 1/02 | 474/903 |
| 2,989,328 A * | 6/1961 | Nitchie | F16D 71/00 | 403/5 |
| 2,994,548 A * | 8/1961 | McGogy | F16D 1/0888 | 403/356 |
| 3,002,773 A * | 10/1961 | Hallgren | F16D 1/0888 | 403/356 |
| RE25,929 E * | 12/1965 | Luenburger | F16H 55/56 | 474/46 |
| 3,356,393 A * | 12/1967 | Casanov | F16D 1/0847 | 403/362 |
| 3,362,734 A * | 1/1968 | Downie | F16B 3/00 | 403/356 |
| 3,378,285 A * | 4/1968 | Staley | F16D 1/0888 | 403/358 |
| 3,421,783 A * | 1/1969 | Sakai | F16D 3/56 | 403/357 |
| 3,428,343 A * | 2/1969 | Downie | F16D 1/0882 | 403/358 |
| 3,436,106 A * | 4/1969 | Luenberger | F16D 1/0876 | 403/356 |
| 3,666,304 A * | 5/1972 | Wilder | F16D 1/0876 | 403/356 |
| 3,703,305 A * | 11/1972 | Wise | F16D 1/0876 | 403/357 |
| 3,822,953 A * | 7/1974 | Adelizzi | F16D 1/0876 | 285/330 |
| 3,862,808 A * | 1/1975 | Perini | F16D 1/0876 | 403/318 |
| 3,877,827 A * | 4/1975 | Adelizzi | B60B 37/04 | 228/152 |
| 3,920,343 A * | 11/1975 | Blue | F16D 1/0876 | 403/356 |
| 3,964,833 A * | 6/1976 | Manriquez | F16D 1/0876 | 403/318 |
| 4,171,939 A * | 10/1979 | Harwath | F04C 15/0073 | 418/270 |
| 4,333,554 A * | 6/1982 | Sink | F16D 13/385 | 192/70.23 |
| 4,572,698 A * | 2/1986 | Rauch | F16D 1/092 | 403/318 |
| 4,615,639 A * | 10/1986 | Seireg | F16D 1/0876 | 403/356 |
| 4,682,069 A * | 7/1987 | Stahl | F16D 1/0876 | 310/216.123 |
| 4,711,605 A * | 12/1987 | Hodlewsky | F16D 1/0876 | 74/439 |
| 4,802,783 A * | 2/1989 | Erikson | F16D 1/00 | 403/375 |
| 5,277,216 A * | 1/1994 | Horton | F16K 1/221 | 29/890.132 |
| 5,553,966 A * | 9/1996 | Morelli | F16D 1/0876 | 403/355 |
| H1647 H * | 5/1997 | Appleman | | 403/355 |
| 5,820,072 A * | 10/1998 | Na | F42B 10/14 | 244/3.28 |
| 6,428,236 B2 * | 8/2002 | Aota | F16D 3/06 | 403/359.5 |
| 11,255,383 B2 * | 2/2022 | Huang | F16D 1/12 | |
| 11,421,480 B2 * | 8/2022 | Peters | E21B 41/00 | |

* cited by examiner

ROTATIONALLY STIFF KEY FOR COUPLING NON-PARALLEL SHAFTS

RELATED APPLICATION

This application claims priority from U.S. Provisional Application 63/060,848, filed Aug. 4, 2020, which is incorporated by reference in its entirety.

FIELD

The present disclosure is in the field of devices and methods for coupling non-parallel shafts, such as shafts of motors with shafts of position sensors.

BACKGROUND

Coupling motor and position sensor shafts when both the motor and position sensor have their own pairs of bearing and hence alignment has always been difficult. If the shafts are directly and rigidly coupled then binding occurs as the shafts rotate when they are not perfectly aligned. This binding causes increased friction and wear on the assemblies. Since the position sensor must accurately measure the angle of the motor shaft, the coupling must have high stiffness in the rotational (shaft twist) direction.

The typical approach, such as for coupling motor and position sensor shafts, uses planer flexures that are perpendicular to the shafts and mount to hubs that are bolted onto each shaft. The ends of the shafts are then separated by some distance. This is stiff in the rotational direction and flexible in the two off-axis directions. The problem with this is a fairly long distance between the motor and position sensor is required. In some applications, for example missile applications, there is often not have enough room for these types of couplings.

Another attempt was to use a rubber key that is retained with adhesive. This configuration is not stiff in the rotational direction and is prone to angle errors when shaft binding occurs.

SUMMARY

According to an aspect of the invention, the key allows for misalignment of shafts without increasing friction.

According to another aspect, the key has high stiffness in the torsion direction, resulting in accurate angle measurements.

According to another aspect, the key enables coupling when the motor and position sensor must be close to each other.

According to another aspect, as a slip fit, the key does not create axial loads on the shafts and their bearings.

According to another aspect, the key is simple to manufacture and low cost.

According to another aspect, the key can be assembled by non-skilled technicians.

According to an aspect of the disclosure, a coupling for non-parallel shafts includes a rotationally stiff key.

According to an aspect of the disclosure, a coupling for misaligned shafts includes a rotationally stiff key.

According to an embodiment of any paragraph(s) of this summary, the coupling has high stiffness in a rotational (shaft twist) direction.

According to an embodiment of any paragraph(s) of this summary, the key is metallic.

According to an embodiment of any paragraph(s) of this summary, the key is rectangular.

According to an embodiment of any paragraph(s) of this summary, the key has reliefs cut into it.

According to an embodiment of any paragraph(s) of this summary, the key is configured such that there are only three points of contact in the two planes parallel to the shafts.

According to an embodiment of any paragraph(s) of this summary, the key allows flexibility in the two planes.

According to an embodiment of any paragraph(s) of this summary, the key allows flexibility in the two orthogonal planes that intersect the axis of one shaft or the other.

According to an embodiment of any paragraph(s) of this summary, the key is stiff in the axis perpendicular to the shafts (in the rotational direction).

According to an embodiment of any paragraph(s) of this summary, the key fits into standard keyways.

According to an embodiment of any paragraph(s) of this summary, the key fits into a keyway on one part and a flat on the other.

According to an embodiment of any paragraph(s) of this summary, the key is a slip fit with the shafts.

According to an embodiment of any paragraph(s) of this summary, the coupling further includes an adhesive to hold the key in place.

According to an embodiment of any paragraph(s) of this summary, contact goes through the key.

According to an embodiment of any paragraph(s) of this summary, the key allows for misalignment of shafts without increasing friction.

According to an embodiment of any paragraph(s) of this summary, contact area(s) of the key are rounded.

According to an embodiment of any paragraph(s) of this summary, the coupling further includes the shafts.

According to an embodiment of any paragraph(s) of this summary, the shafts include a motor shaft.

According to an embodiment of any paragraph(s) of this summary, the shafts include a position sensor shaft.

According to an embodiment of any paragraph(s) of this summary, the position sensor shaft is a rotary position sensor shaft.

According to an embodiment of any paragraph(s) of this summary, the motor and the position sensor are close to each other.

According to an embodiment of any paragraph(s) of this summary, the shafts each have their own bearings.

According to an embodiment of any paragraph(s) of this summary, a method of coupling shafts uses the coupling/key of any preceding claim(s).

According to an embodiment of any paragraph(s) of this summary, the coupling is part of a missile.

According to a further aspect of the disclosure, a coupling includes: a first shaft; a second shaft; and a key rotationally coupling together the shafts, wherein the key has a main body and a protrusion from the main body, with the protrusion engaging the first shaft and the main body engaging the second shaft.

According to a still further aspect of the disclosure, a key for rigidly coupling together a pair of coaxial shafts so as to compensate for misalignment of the shafts, includes: a main body configured to mechanically engage one of the shafts; and a protrusion from a middle portion of the main body to engage the other of the shafts; wherein the key is made of metal; and wherein the key is configured for placement in a keyway, between the shafts.

According to yet another further aspect of the disclosure, a method of coupling together a pair of shafts includes:

placing a rigid key between the shafts, wherein the placing includes: engaging one of the shafts with a main body of the rigid key; and engaging the other of the shafts with a protrusion of the rigid key that extends from the main body; wherein the placing includes rotation of the rigid key to maintain a rigid torsional connection between the shafts despite angular misalignment of the shafts.

While a number of features are described herein with respect to embodiments of the disclosure; features described with respect to a given embodiment also may be employed in connection with other embodiments. The following description and the annexed drawings set forth certain illustrative embodiments of the disclosure. These embodiments are indicative, however, of but a few of the various ways in which the principles of the disclosure may be employed. Other objects, advantages, and novel features according to aspects of the disclosure will become apparent from the following detailed description when considered in conjunction with the drawings.

BRIEF DESCRIPTION OF THE DRAWINGS

The annexed drawings, which are not necessarily to scale, show various aspects of the disclosure.

DETAILED DESCRIPTION

A stiff key provides rigid coupling between a pair of shafts, such as a motor shaft and a rotary position sensor. The key may have a main body and a protrusion from the main body, such as from a middle portion of the main body. One of the protrusion or the main body may engage one part of one of the shafts being coupled together, and the other of the protrusion or the main body may engage a part of the other of the shafts. For example the protrusion may be in a keyway of one shaft and the main body may engage a recess or flat of the other shaft. The key and the coupling may be used in applications where space is at a premium, for example in a missile.

A stiff (metallic) key, such as a rectangular key, has reliefs cut into it, or more broadly has a protrusion, such that there are only three points of contact in the two planes parallel to the shafts, or more broadly at least in a plane parallel to the bottom of the keyway. Orthogonal to the plane at the bottom of the keyway there are at most three points of contact. This allows flexibility in this plane between the shaft while being stiff in the axis of the shafts (in the rotational direction). This key will fit into standard keyways or a key way on one part and a flat on the other. This key will be a slip fit on at least one of the shafts so to not place a load (such as an axial load) on the shafts during installation, and thus increasing friction. A soft adhesive can be used with it to eliminate rattling and reduce backlash. When using this device there shall be enough diametrical clearance between the ID of the outer shaft and the OD of the inner shaft such that these surfaces will not contact each other and cause binding. All contact should go through the key.

Figure 1A:
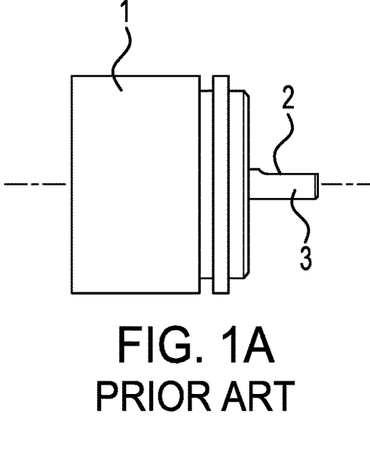
FIG. 1A shows one aspect of a prior art coupling between shafts of rotary position sensor and a motor shaft.
Figure 1B:
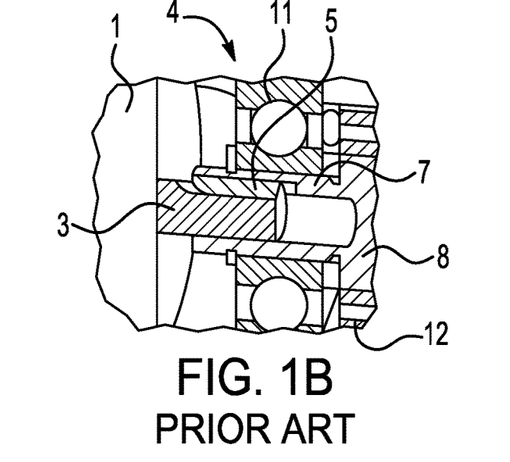
FIG. 1B shows another aspect of a prior art coupling between shafts of rotary position sensor and a motor shaft.
Figure 1C:
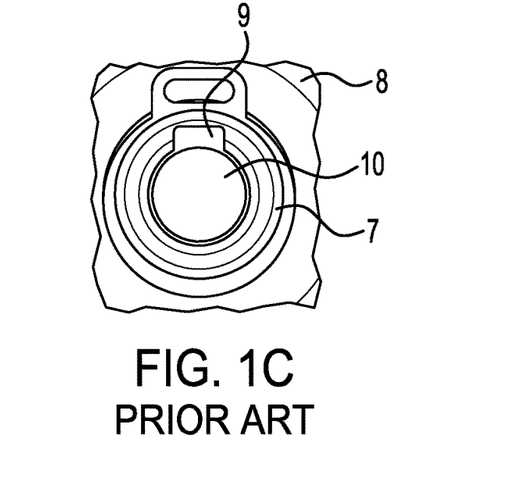
FIG. 1C shows yet another aspect of a prior art coupling between shafts of rotary position sensor and a motor shaft.

FIGS. 1A-1C illustrate the problem definition and some of the current state of the art. Shown in FIG. 1A is a typical rotary position sensor 1 with a flat 2 on a shaft 3. FIG. 1B shows a short distance coupling 4 using a rubber key 5, with the coupling 4 being between the rotary position sensor shaft 3 and an output shaft 7 of a motor 8 (FIG. 1C). FIG. 1C shows an end view of the motor output shaft 7, showing an internal keyway 9 of the motor shaft 7. The keyway 9 is off of an opening 10 in the motor output shaft 7. The opening 10 receives the rotary position sensor shaft 3, and the rubber key 5 is located in the keyway 9, between the flat 2 and the inner surface that defines the opening 10.

The rubber key 5 provides a short-distance coupling between the shafts 3 and 7. Note from FIG. 1B that a rotary position sensor bearing 11 around the rotary position sensor shaft 13 is close to a motor bearing 12 around the motor shaft 7. The key 5 provides a flexible coupling between the shafts 3 and 7, that can to some degree maintain coupling between the shafts 3 and 7. However the key 5 does not provide good torsional stiffness in the coupling, in that its flexibility provides undesired torsional deformability or yielding ("give").

Figure 2:
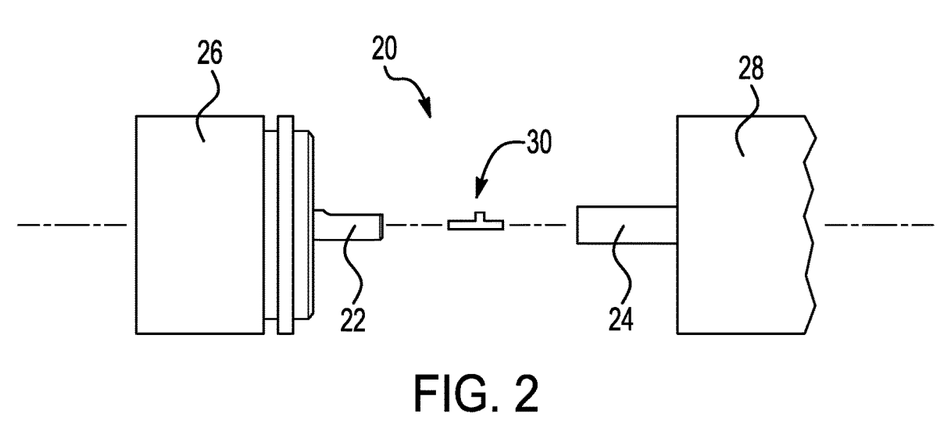
FIG. 2 shows an exploded view of a system for coupling shafts, according to an embodiment of the disclosure.

FIG. 2 shows a system 20 for coupling together respective shafts 22 and 24 of devices 26 and 28. In one embodiment a stiff key 30 is used to couple together the shafts 22 and 24. The key 30 provides a connection between the shafts 22 and 24 so that rotation in one of the shafts results in rotation of the other shaft. Parts of the key 30 may be in and may make contact with a keyway in or defined by one of the shafts 22 and 24, while other parts of the key 30 may make contact with a surface (for example the flat 2 (FIG. 1A) on the other of the shafts 22 and 24. The key 30, in its various embodiments discussed in greater detail below, is able to compensate to some degree for misalignment between the shafts 22 and 24, compensating for angular misalignment (difference in angles of orientation between axes of the shafts 22 and 24) and/or translational misalignment (distance perpendicular to the axes of the shafts 22 and 24). However more broadly the system 20 may involve coupling together of shafts, regardless of the types of devices coupled together. Examples of other types of devices include hydraulic pumps, electrical generators, compressors, crushers, mixers, etc.

The key 30 may be made of a suitable material, for example a stiff metal. Nonlimiting examples of suitable materials include steel and brass.

In many of the embodiments described herein that devices coupled together are a motor and a rotational positional sensor. The term "rotational position sensor," as used herein, is meant to broadly denote rotational sensors having shafts, for example including potentiometers and encoders that are used to detect rotational movement (or position) of a shaft.

FIGS. 3-6 shows an example embodiment, a rotationally stiff key 40 for coupling non-parallel shafts. The key 40 extends longitudinally (axially) in an X direction, has a height in a Y direction, and a width in a Z direction. Three points of contact allow misalignment in the XZ plane, but are stiff in the Z direction. Three points of contact allow misalignment in the XY plane, but are stiff in the Y direction. Stiffness in the Y and Z directions makes the connection stiff about the X axis, which is parallel to the axis of the shaft, resulting in a rotationally stiff coupling. As described further below with regard to other embodiments, the contact areas could be rounded, for example as illustrated at reference number 41.

The key 40 has an elongate main body 42, with a middle portion 44 and end portions 46 and 48 on opposite ends. In the illustrated embodiment, the key 40 has a rectangular cross-sectional area at all parts, but it will be appreciated that this not necessarily be so.

At least one of the middle portion 44 and the end portions 46 and 48 has protrusion(s) in the height (Y direction) and/or width (Z direction). In the key 40 all three, the middle portion 44 and the two end portions 46 and 48, all have protrusions (though not all in the same direction), but different embodiments may have one or more portions without protrusions.

Figure 3:
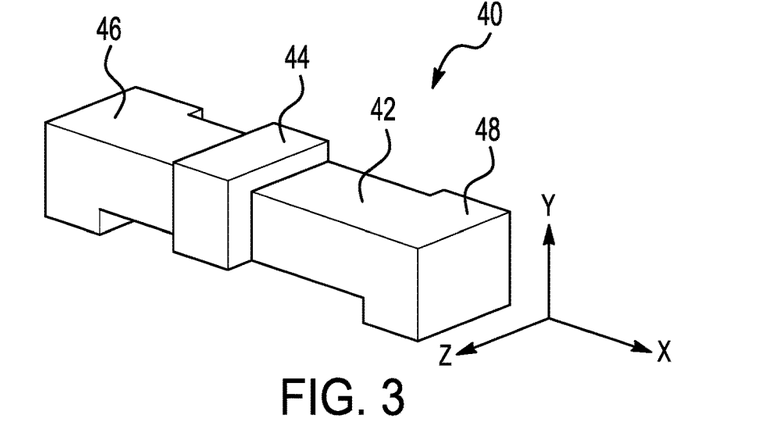
FIG. 3 is an oblique of one embodiment of a key for use as part of the system of FIG. 2.
Figure 4:
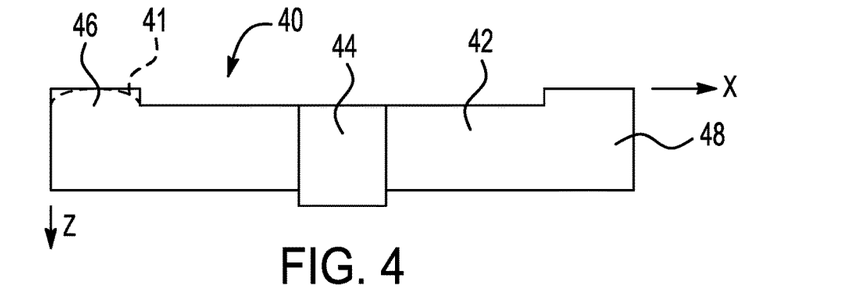
FIG. 4 is a plan view of the key of FIG. 3.
Figure 5:
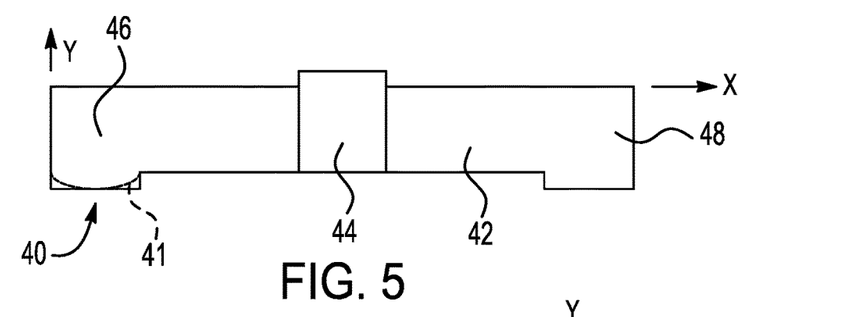
FIG. 5 is a side view of the key of FIG. 3.
Figure 6:
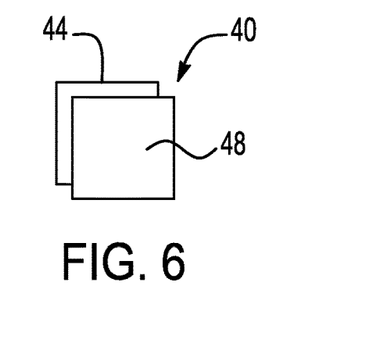
FIG. 6 is an end view of the key of FIG. 3.

The protrusion(s) in the middle portions 44 are in at least one different direction than the protrusion(s) in the end portions 46 and/or 48. This allows, for example, a middle portion protrusion to protrude into a keyway (such as the keyway 9 (FIG. 1B), making contact with one of a pair of shafts to be coupled, while other parts of the key 40 make contact with the other of the pair of shafts. This contact advantageously may be a planar contact or a line contact, and provides a rigid connection between the shafts, even allowing for some misalignment, such as angular misalignment between the shafts. The connection through the key 40 may be rigid, even torsionally, reflecting the rigidity of the key 40. This stiff or rigid torsional connection provides an accurate transfer of rotational position between the shafts, even allowing for some misalignment (such as angular misalignment) between the shafts.

The key 40 may be made by machining, such as milling, subtracting (removing) material from a parallelepiped stock. The stock may be a square cross-section stock. In nonlimiting examples the key 40 may have a length of 50-75 mm (2-3 inches), and may have width and height of about 3 mm (⅛ inch)

The key 40 (and/or the other keys described herein) have several advantageous characteristics. The keys may maintain acceptable rotational angle accuracy between the shafts, typically <1 degree. The keys do not create excessive radial loads on the bearings due to misalignments—such excessive loads can cause damage and excessive friction. And the keys allow the motor and position sensors to be close to each other, at a distance (for example) of about one times the diameter of the shafts or less. Other advantages for coupling using the key 40 (or other keys described herein) in coupling shafts are low cost, ease of manufacture and assembly, and low manufacturing variability. When used as a slip fit, keys such as described herein do not create axial loads on the shafts and their bearings. The key allows for misalignment of shafts without increasing friction.

Figure 7:
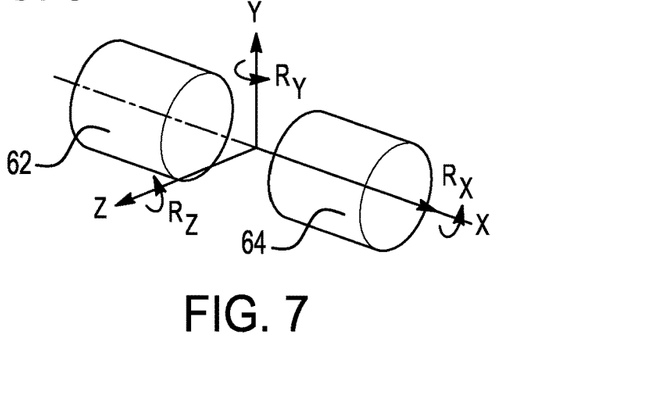
FIG. 7 schematically shows coupling between a pair of shafts, according to an embodiment of the disclosure.

With reference to FIG. 7, desirable characteristics are now outlined for a coupling between a position sensor shaft 62 and a motor shaft 64, with keys such as the key 40 (FIG. 3) constituting part of such a coupling. Stiffness should be high in Rx direction to maintain angle accuracy. Stiffness should be low in the $R_Y$ and $R_Z$ directions to accommodate angular misalignments. Stiffness should be low in the X direction (axial direction) to accommodate axial misalignments. Radial position of the two shafts 62 and 64 should be held in close alignment at the coupler before bolting assemblies together (initial shaft radial positions must be equal (or about equal) when assembling the two assemblies).

Figure 8:
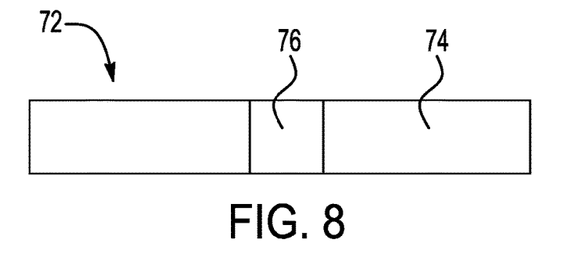
FIG. 8 is a plan view of a key according to another embodiment of the disclosure.
Figure 9:
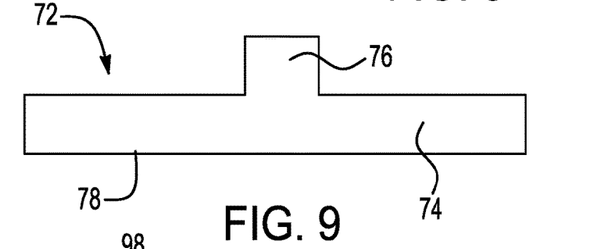
FIG. 9 is a side view of the key of FIG. 8.
Figure 10:
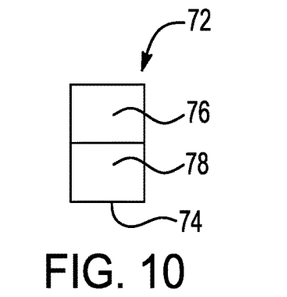
FIG. 10 is an end view of the key of FIG. 8.
Figure 11:
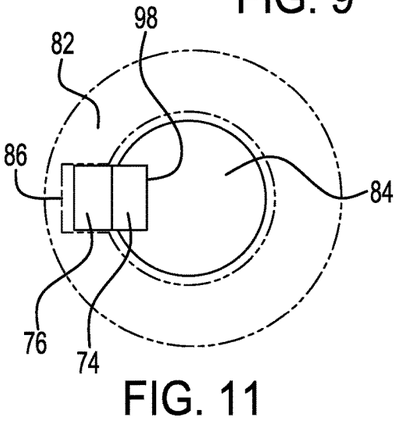
FIG. 11 is an end view of coupled shafts using the key of FIG. 8.
Figure 12:
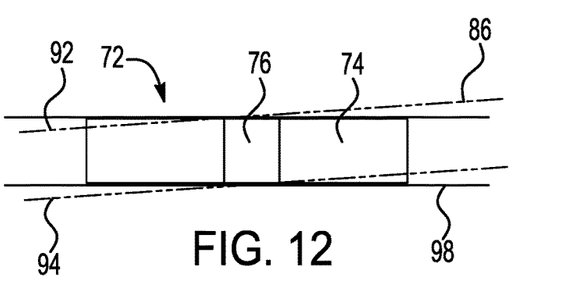
FIG. 12 is a plan view of the coupling of FIG. 11 with misaligned shafts.

FIGS. 8-10 illustrate a key 72 according to another embodiment, and FIGS. 11 and 12 show the key 72 interfacing and providing a coupling between a pair of (somewhat misaligned) shafts 82 and 84. The key 72 includes a main body 74, having a parallelepiped shape, with a protrusion 76 extending out of one face of the main body 74. The protrusion 76 has a rectangular (such as square) cross-sectional shape, but in other embodiments the protrusion may have a different cross-sectional shape. The protrusion 76 may extend fully across a width of the main body 74, as is illustrated, but alternatively may not fully extend across the width of the main body 74. The protrusion 76 may be in a middle portion of the main body 74, for example between 25% and 75% of the way along the length of the main body 74, or more narrowly between 40% and 60% of the way along the length (to give two non-limiting examples of possible ranges).

As seen in FIGS. 11 and 12, the protrusion 76 is located in the keyway 86 of the shaft 82, and is in contact with side surfaces 92 and 94 of the keyway 86. A bottom surface 78 of the main body 74, on an opposite side of the main body 74 from the protrusion 76, is in contact with a flat (or recess) 98 of the shaft 84. This configuration works when there is some clearance between the protrusion 76 and the side surfaces 92 and 94. In other words the keyway 86 is wider than the protrusion 76.

The contact between different parts of the key 72 with both of the shafts 82 and 84 provides a solid rigid connection between the shafts 82 and 84. This is despite the angular misalignment of the shafts 82 and 84 as illustrated in FIG. 12.

As shown the protrusion 76 is in the keyway 86 and the main body 76 engages the flat or recess 98. Alternatively the key 72 may be installed so that the protrusion 76 contacts the shaft 84, and the main body 74 is in contact with the shaft 82. This alternative arrangement is in general available for the other embodiments described herein.

What follows now are further embodiments of keys, all shown engaging with the same misaligned shafts 82 and 84 shown in FIGS. 11 and 12. Alternatives described above with regard to the key 72 in general apply to these further embodiments.

Figure 13:
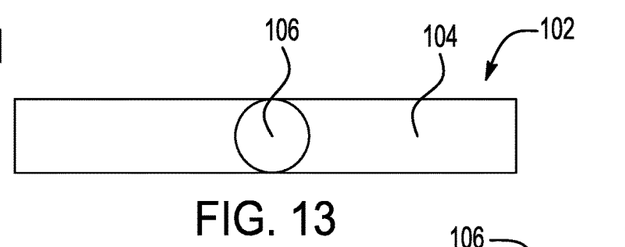
FIG. 13 is a plan view of a key according to another embodiment of the disclosure.
Figure 14:
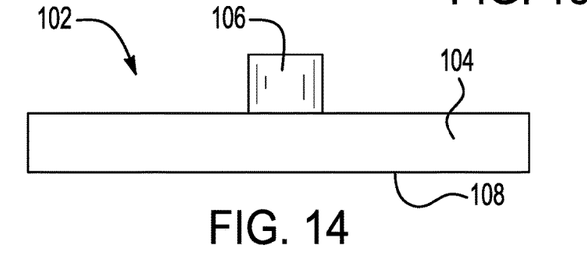
FIG. 14 is a side view of the key of FIG. 13.
Figure 15:
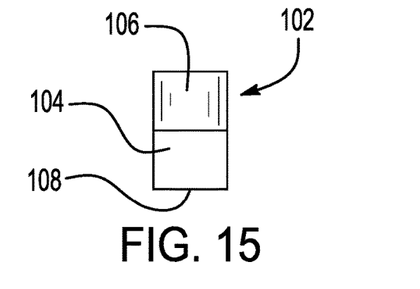
FIG. 15 is an end view of the key of FIG. 13.
Figure 16:
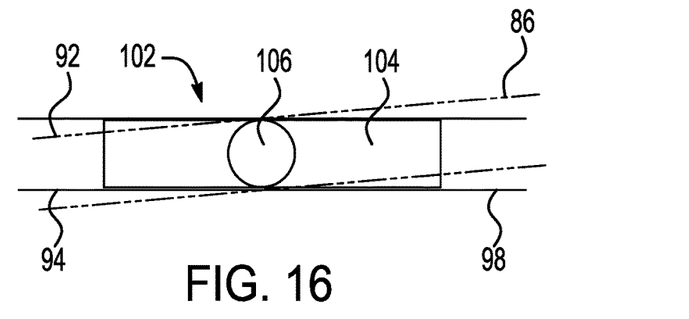
FIG. 16 is a plan view of misaligned coupled shafts using the key of FIG. 13.

FIGS. 13-15 show a key 102 that has a main body 104, and a cylindrical protrusion 106 extending away from the main body 104. As shown in FIG. 16, the key 102 may be used to couple the shafts 82 and 84 (FIG. 12), with the cylindrical protrusion 106 in the keyway 96, and a bottom surface 108 engaging the flat or recess 98. This configuration will operate with no clearance between the cylindrical protrusion 106 and the keyway side surfaces 92 and 94, and the protrusion 106 able to make contact with both of the side surfaces 92 and 94 for a variety of orientations (angular misalignments).

Figure 17:
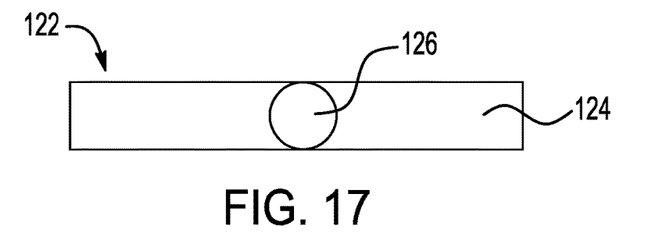
FIG. 17 is a plan view of a key according to still another embodiment of the disclosure.
Figure 18:
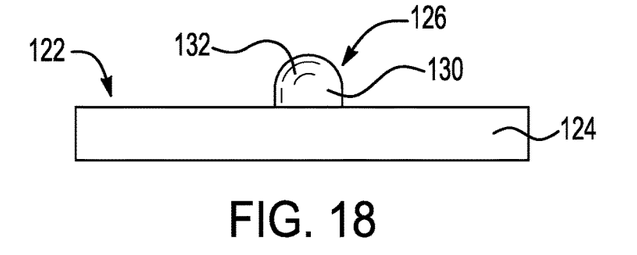
FIG. 18 is a side view of the key of FIG. 17.
Figure 19:
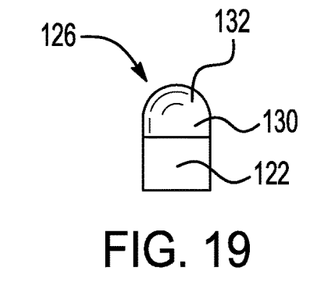
FIG. 19 is an end view of the key of FIG. 17.
Figure 20:
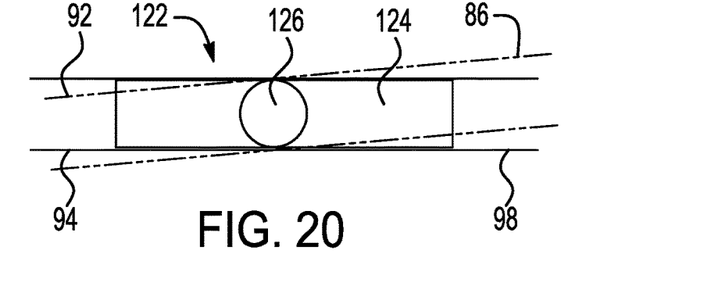
FIG. 20 is a plan view of misaligned coupled shafts using the key of FIG.

FIGS. 17-19 show a key 122 that has a main body 124, and a bullet-shaped protrusion 126 extending away from the main body 124. The protrusion 126 has a cylindrical lower (proximal) portion 130 where the protrusion 126 extends from the main body 124, and a curved upper (distal) portion 132 further from the main body 124. As shown in FIG. 20, the key 122 may be used to couple the shafts 82 and 84 (FIG. 12), with the cylindrical protrusion 126 in the keyway, and a bottom surface 128 engaging the flat or recess 98. Stiffness in the Y and Z directions makes the connection stiff about the X axis, which is parallel to the axis of the shaft, resulting in a rotationally stiff coupling. This configuration will work with no clearance to the outer keyway which will eliminate backlash, and also is able to provide a connection even with some angular misalignment in other directions. As with other embodiments, the orientation can be flipped also with the bullet part in an inner keyway.

Figure 21:
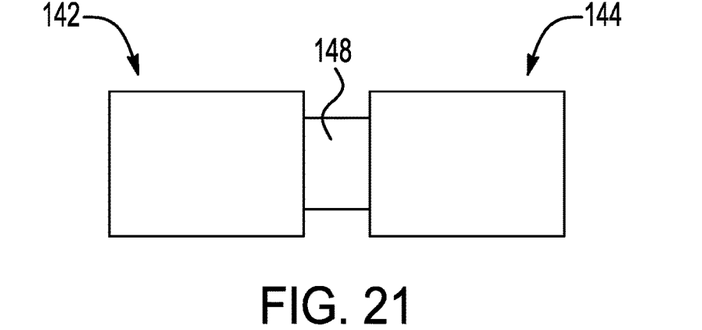
FIG. 21 is a plan view of a key according to yet another embodiment of the disclosure.
Figure 22:
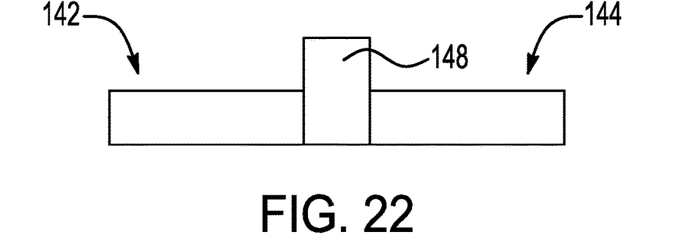
FIG. 22 is a side view of the key of FIG. 21.
Figure 23:
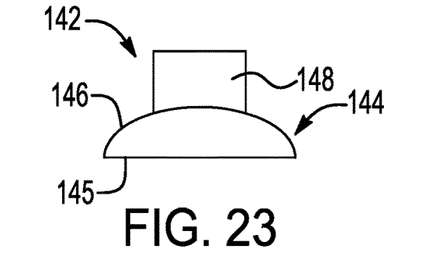
FIG. 23 is an end view of the key of FIG. 21.

FIGS. 21-23 show a key 142 that has a main body 144 with a flat lower surface 145 and a curved upper surface 146, with the key 142 further including a protrusion 148 extending away from the main body 144. The main body 144 is configured for engaging a flat, as opposed to a keyway. The protrusion 148 is illustrated as having a rectangular cross section, but may alternatively have other cross sections as described in the other embodiments discussed herein.

Figure 24:
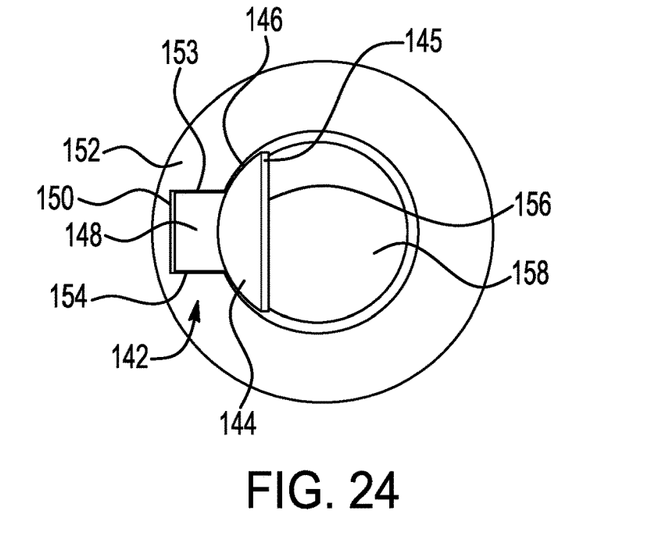
FIG. 24 is an end view of coupled shafts using the key of FIG. 21.
Figure 25:
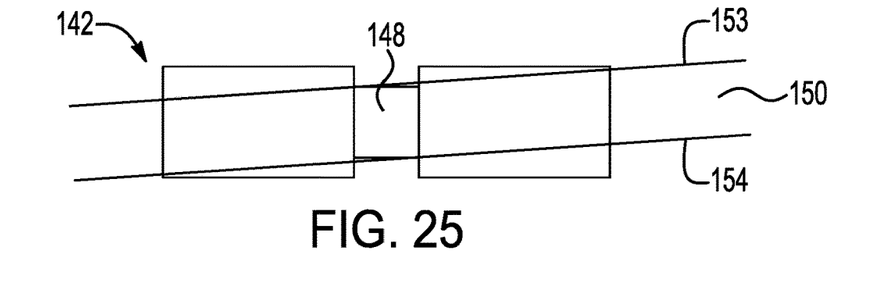
FIG. 25 is a plan view of the coupling of FIG. 24 with misaligned shafts.

As seen in FIGS. 24 and 25, the protrusion 148 is located engaging a keyway 150 of a shaft 152, and is in contact with side surfaces 153 and 154 of the keyway 150. The flat bottom surface 145 of the main body 144 is in contact with and engages a flat 156 of a shaft 158.

The contact between different parts of the key 142 with both of the shafts 152 and 158 provides a solid rigid connection between the shafts 152 and 158. This is despite the angular misalignment of the shafts 152 and 158 illustrated in FIG. 25.

Figure 26:
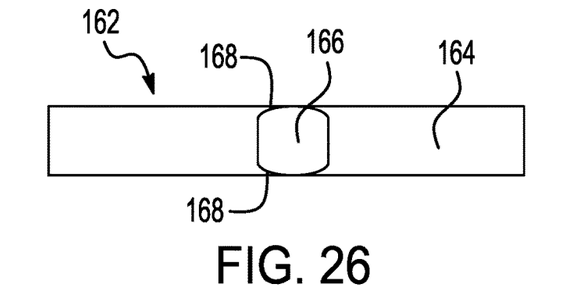
FIG. 26 is a plan view of a key according to a further embodiment of the disclosure.
Figure 27:
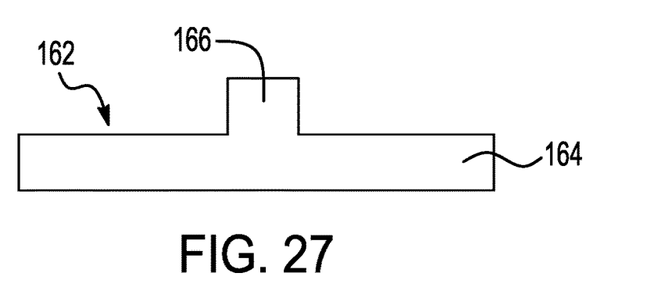
FIG. 27 is a side view of the key of FIG. 26.
Figure 28:
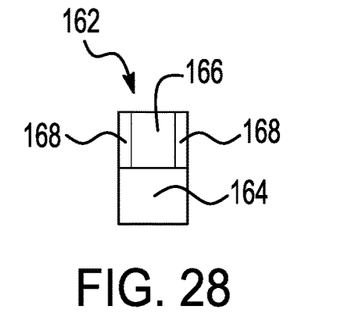
FIG. 28 is an end view of the key of FIG. 26.
Figure 29:
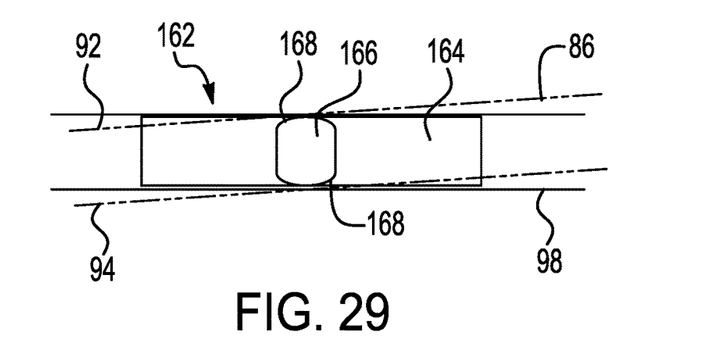
FIG. 29 is a plan view of misaligned coupled shafts using the key of FIG. 26.

FIGS. 26-28 show another alternative, a key 162 having a main body 164, with a rounded-edge rectangular protrusion 166 extending away from the main body 164. The rounded edges (curved faces) of the protrusion 166, such as shown in 168, may aid in maintaining contact between the protrusion 166 and the keyway side surfaces 92 and 94, as shown in FIG. 29. In addition the protrusion 166 may have better strength than other embodiments, for example the cylindrical protrusion 106 shown in FIGS. 13-15.

Figure 30:
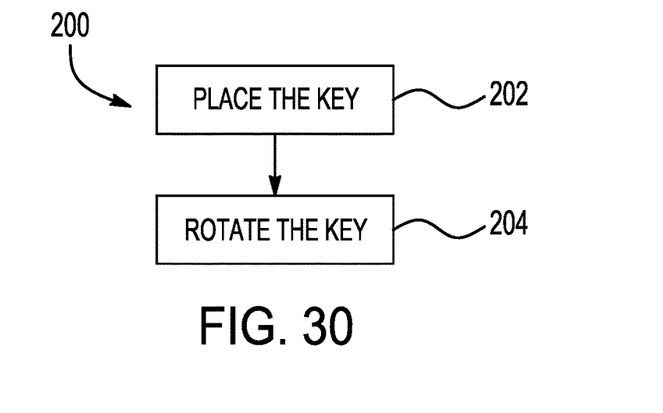
FIG. 30 is a high-level flow chart of a method, according to an embodiment of the disclosure.

FIG. 30 shows steps of a method 200 for coupling together a pair of shafts, using a key such as described above. In step 202 the key is placed between the shafts. The placing in step 202 may include engaging one of the shafts with a main body of the rigid key, and engaging the other of the shafts with a protrusion of the rigid key that extends from the main body. In step 204 the key may be to maintain a rigid torsional connection between the shafts despite angular misalignment of the shafts.

Although the disclosure has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the disclosure. In addition, while a particular feature of the disclosure may have been described above with respect to only one or more of several illustrated embodiments, such feature may be combined with one or more other features of the other embodiments, as may be desired and advantageous for any given or particular application.

What is claimed is:

1. A coupling comprising:
    a first shaft;
    a second shaft; and
    a key rotationally coupling together the shafts, wherein the key has a main body and a protrusion from the main body, with the protrusion engaging the first shaft and the main body engaging the second shaft;
    wherein the protrusion has opposing curved surfaces for engaging the first shaft; and
    wherein the protrusion has opposing flat surfaces that are between the opposing curved surfaces, with the opposing flat surfaces not engaging the first shaft.

2. The coupling of claim 1, wherein the key is made of metal.

3. The coupling of claim 1, wherein one of the shafts is inserted into the other of the shafts.

4. The coupling of claim 1, wherein rotational contact between the shafts goes through the key.

5. The coupling of claim 1, wherein one of the shafts has a keyway that contacts one of the main body or the protrusion, and the other of the shafts has a recess or flat that contacts the other of the main body or the protrusion.

6. The coupling of claim 1, wherein the key is stiffer in a rotational direction of the shafts, than in a direction of angular misalignment of the shafts.

7. The coupling of claim 1, wherein the key has a slip fit with the shafts.

8. The coupling of claim 1, wherein the main body has a rectangular cross section.

9. The coupling of claim 1, wherein the protrusion is in a middle portion of the main body.

10. The coupling of claim 1, wherein the protrusion and the main body have the same width.

11. The coupling of claim 1,
    wherein the first shaft is a motor shaft of a motor; and
    wherein the second shaft is a shaft of a rotary position sensor.

12. The coupling of claim 11, wherein the motor and the rotary position sensor are within one shaft diameter of each other.

13. The coupling of claim 11, wherein one of the shafts is inserted into the other of the shafts.

14. The coupling of claim 11, wherein one of the shafts has a keyway that contacts one of the main body or the protrusion, and the other of the shafts has a recess or flat that contacts the other of the main body or the protrusion.

15. The coupling of claim 11, wherein the key is stiffer in a rotational direction of the shafts, than in a direction of angular misalignment of the shafts.

16. The coupling of claim 11, wherein the main body has a rectangular cross section.

17. The coupling of claim 11, wherein the protrusion is in a middle portion of the main body.

18. The coupling of claim 11, wherein the protrusion and the main body have the same width.

19. The coupling of claim 1, wherein the coupling is part of a missile.

\* \* \* \* \*